United States Patent [19]
Ashton et al.

[11] Patent Number: 5,623,693
[45] Date of Patent: Apr. 22, 1997

[54] SYSTEM FOR PERFORMING ACTION BY SORTING ACTIONS INTO IMMEDIATE AND DEFERRED QUEUES, PROCESSING IMMEDIATE QUEUE WHILE STILL SORTING, AND APPENDING DEFERRED QUEUE TO IMMEDIATE AFTER SORTING

[75] Inventors: Lyn L. Ashton; Anthony S. Pearson; Jerry W. Pence, all of Tucson, Ariz.

[73] Assignee: International Business Machines Corporation, Armonk, N.Y.

[21] Appl. No.: 198,005

[22] Filed: Feb. 17, 1994

[51] Int. Cl.$^6$ .................................................. G06F 12/00
[52] U.S. Cl. .................... 395/825; 395/859; 395/874; 364/238.3; 364/281.6; 364/281.8
[58] Field of Search ................................ 395/275, 200, 395/650, 600, 859, 874; 364/148, 402; 370/94.1; 361/238.3, 280

[56] References Cited

U.S. PATENT DOCUMENTS

| | | | |
|---|---|---|---|
| 4,510,567 | 4/1985 | Chang et al. | 395/600 |
| 4,587,628 | 5/1986 | Archer et al. | 395/600 |
| 4,642,756 | 2/1987 | Sherrod | 395/650 |
| 5,020,019 | 5/1991 | Ogawa | 395/600 |
| 5,089,985 | 2/1992 | Chang et al. | 395/600 |
| 5,091,852 | 2/1992 | Tsuchida et al. | 395/600 |
| 5,140,683 | 8/1992 | Gallo et al. | 395/425 |
| 5,325,523 | 6/1994 | Beglin et al. | 395/600 |
| 5,345,584 | 9/1994 | Hill | 395/600 |
| 5,418,971 | 5/1995 | Carlson | 395/800 |
| 5,423,018 | 6/1995 | Dang et al. | 395/425 |
| 5,469,560 | 11/1995 | Beglin | 395/439 |

Primary Examiner—Thomas C. Lee
Assistant Examiner—Anderson I. Chen
Attorney, Agent, or Firm—Baker, Maxham, Jester & Meador

[57] ABSTRACT

A procedure for the optimal processing of variable-cost actions such as encountered in the storage reclamation procedures for a multivolume data library. The procedure introduces a temporary processing queue to minimize idle processing capacity during the scanning and sorting of a large plurality of variable-cost actions such as the recycling of a plurality of data storage volumes each having a variable recycle processing cost related to the action of valid data remaining on the volume. Volumes (actions) are selected for the immediate queue according to a dynamically-adjusted threshold test for the processing cost. This processing cost threshold is dynamically adjusted to optimize the immediate queue in relation to the available processing capacity. After scanning and sorting all volumes according to recycle processing cost, the temporary (immediate) queue is updated to a final recycle processing queue by appending a sorted deferred queue to the remainder of the immediate queue. The procedure of this invention minimizes idle processing capacity during the queue-building interval, thereby optimizing the number of recovered data storage volumes released in a given time interval.

20 Claims, 5 Drawing Sheets

SYSTEM FOR PERFORMING ACTION BY SORTING ACTIONS INTO IMMEDIATE AND DEFERRED QUEUES, PROCESSING IMMEDIATE QUEUE WHILE STILL SORTING, AND APPENDING DEFERRED QUEUE TO IMMEDIATE AFTER SORTING

BACKGROUND OF THE INVENTION

1. Field of the Invention

This invention relates in general to computer-controlled processing of variable-cost actions and particularly to procedures for reclaiming data storage volumes in a multivolume data storage library.

2. Discussion of the Related Art

Memory compaction or "defragmentation", also denominated "garbage collection", is a necessary operation in any large database processing system. Memory compaction is a procedure whereby valid data scattered throughout the memory system are collected or "compacted" together, thereby freeing up unused memory space in larger contiguous sections. The gradual "fragmentation" of a data storage system is a normal result of data processing over time. Thus, "garbage collection" is performed routinely, either in "snapshots" at regular intervals or on a continuing basis.

Storage reclamation is a necessary procedure in every level of a hierarchical data storage system. For instance, a large data storage space such as described by Gelb et al. in U.S. Pat. No. 5,018,060, which is entirely incorporated herein by this reference, includes many different physical data storage devices for peripheral data storage. Such devices may include Direct Access Storage Devices (DASDs) employing high-speed magnetic disk technology, magnetic tape storage devices, optical disk storage devices and several types of solid-state random access memory (RAM). The slower of these storage devices generally provide the higher data storage capacity and, therefore, present the more challenging garbage collection problems.

In the present art, "garbage collection" procedures move data from one place to another to create large contiguous sections of available storage. In RAM, the data are moved in byte increments. In DASDs, the data are moved in track increments. Thus, for RAM or DASD garbage collection, the necessary actions have a constant "cost". However, for storage recovery in data storage libraries, organized in physical volumes (e.g., tape or optical disk), the data are moved in variable increments, depending on the available space in a volume as a fraction of volume data storage capacity. Herein, this is denominated a "variable cost" action. The reason for such cost variability can be appreciated by considering another distinction. In RAM or DASD data storage, empty space can be accumulated into arbitrarily large contiguous blocks, with the larger contiguous block being the more desirable. However, there is no operating advantage for freeing a contiguous data storage block larger than a single data volume in a multivolume data storage library system. Finally, RAM or DASD data storage permit reuse of invalid data storage areas by simply overwriting with new valid data. This is useful for either contiguous or discontiguous allocations of storage, as is known in the art. However, in a multivolume data storage library system, discontiguous storage of a single data block by allocation to several volumes is not a feasible storage scheme unless the block exceeds volume capacity. Thus, storage reclamation in a data storage library requires collection of valid data blocks or "fragments" to release empty volumes for reuse. This collection of valid data is a variable-cost action that is a function of the storage conditions in the particular volume that is to be released and is herein denominated "recycling".

For instance, a multi-volume library system, such as the IBM 3495 Tape Library Data Server or the 3995 Optical Library Data Server, includes a large number of individual volumes or cartridges and a smaller number of drives for reading and writing data from and to selected volumes. As system operating time passes, the fraction of each initially active library volume containing valid data generally declines, eventually to zero. That is, the data library volumes accumulate "empty" or unused space over time. Because most older volumes still retain valid data occupying a few percent of volume capacity, the valid data must be transferred to a "compacted" target volume before the older volume can be recycled for use as an empty volume. This transfer and compaction of valid data from "low-density" source volumes to "compacted" target volumes in such a data library is the process required to reclaim empty data storage volumes for reuse. Even empty volumes requiring no data transfer must be actively released for reuse.

In concept, storage reclamation in a multivolume library system is uncomplicated. The user first specifies the number of volumes to be reclaimed, say 300. The system then proceeds to compact valid data by mounting, transferring and recycling the library volumes in some sequence until the desired number of empty volumes are released.

The user may specify a maximum value for the percentage of valid data permitted in a source volume selected for recycling. By limiting the occupied "fraction" or percentage of valid data in a volume, the required number of recycled volumes can be obtained with fewer mounts and transfers. For instance, if only volumes having no more than, say, 40% valid data are recycled, no more than 300/0.60=500 source and 200 target volumes need be mounted (700 mounts altogether) and processed to obtain the 300 empty volumes desired.

As another example, consider a data storage library where volumes having no more than 25% valid data are recycled to reclaim 300 free volumes. Thus, 300/0.75=400 source and 100 target volumes must be mounted and processed. Therefore, the same 300 volumes are released with only 500 total mounts instead of 700. This illustrates the variability of processing cost, which is affected by the average source volume fraction occupied by valid data.

Unfortunately, a simple naive source volume recycling procedure is painfully slow and inefficient when applied to one or more large data libraries having, for instance, in excess of 100,000 volumes. A better idea would be to process and recycle the emptiest volumes (the volumes having the lowest percentage of valid data occupancy) first, thereby minimizing the number of mounts necessary to produce a given number of recycled empty volumes. This sort of improvement is not motivated in the art because no net savings are realized when an entire library is processed for recycling. The idea gains importance in a library where volumes are reclaimed under a time limit or as a specified number of recycled volumes, however. For instance, in a large data storage tape library having in excess of 100,000 volumes, storage reclamation time for only 300 free volumes can extend beyond 24 hours. If a storage reclamation procedure is initiated daily, garbage collection may never be completed in such a system.

Thus, there is a clearly-felt need in the art for an optimized storage reclamation procedure for use in large multivolume data storage libraries. Such an optimized procedure should maximize the storage capacity reclaimed over a given time interval. Even scanning and presorting over 100,000 volumes into a processing queue ordered by the fraction of volume capacity that is occupied with valid data (that is, by the variable cost for each volume) is not a complete solution to this problem. This is because searching and sorting through over 100,000 volumes itself requires a substantial time interval during which no storage reclamation occurs. On the other hand, the naive "brute-force" method known in the art is also wasteful of recycling capacity because the recycled volumes are selected without considering relative processing cost in terms of the amount of empty space available in each recycled volume.

Although the storage reclamation optimization problem is reminiscent of the query optimization problem known in the database processing art, available query optimization techniques are not helpful in solving the library storage reclamation optimization problem, mainly because query processing elements do not generally include variable-cost actions. For instance, in U.S. Pat. No. 5,089,985, Chang et al. consider the essential dilemma posed in a data processing system by holding the list processing capacity idle during a sorting procedure. Chang et al. suggest sending sorted data to the user as soon as the first data are sorted into final sort order instead of awaiting completion of the entire sort. However, in a library storage reclamation procedure, the volume scanning takes more time than the sort and the final sort order of any particular volume cannot be determined until all volumes have been scanned at least once. Thus, the Chang et al. method suggests no improved solution to the library storage reclamation optimization problem.

Another method in the existing art for library storage reclamation is to screen the entire library with a predetermined "percent-valid" (recycle cost) threshold, processing all volumes that meet the threshold test. After completion of the first library screening and processing step, the screening threshold is then adjusted upward to a second predetermined value and the entire library is again screened and processed to release more volumes. This iterative procedure continues until the desired number of volumes have been released. While this method is somewhat more efficient than the naive method discussed above, it requires multiple passes and affords no opportunities for optimizing the fixed screening thresholds.

Other practitioners discuss similarly unhelpful database query optimization points in U.S. Pat. Nos. 5,091,852, 5,020,019, 4,510,567, and 4,587,628, and neither consider nor suggest a solution to the variable-cost reclamation optimization problem encountered in large multivolume data storage libraries. These unresolved problems and deficiencies are clearly felt in the art and are solved by this invention in the manner described below.

SUMMARY OF THE INVENTION

The system of this invention optimizes the processing of variable-cost actions such as encountered in the storage reclamation procedures for a multivolume data library by introducing two queues. While a volume scan is building a deferred queue, recycle processing capacity is kept occupied with volumes from an immediate queue. After completion of the volume scan, the deferred volumes are sorted by the valid data occupancy fraction $F_n$ of volume capacity (an indicator of processing cost) and are appended to the immediate queue. Volumes are selected for the immediate queue according to a dynamically-adjusted threshold test for the valid data occupancy fraction $F_n$. This processing cost threshold T is dynamically adjusted to optimize the immediate queue without sorting.

It is an object of the system of this invention to minimize the total time required to release a desired number of empty volumes. It is a feature of the system of this invention that idle recycle processing capacity is minimized while average recovered storage space per recycled volume is maximized to release the most volumes in the least amount of time.

The foregoing, together with other objects, features, advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
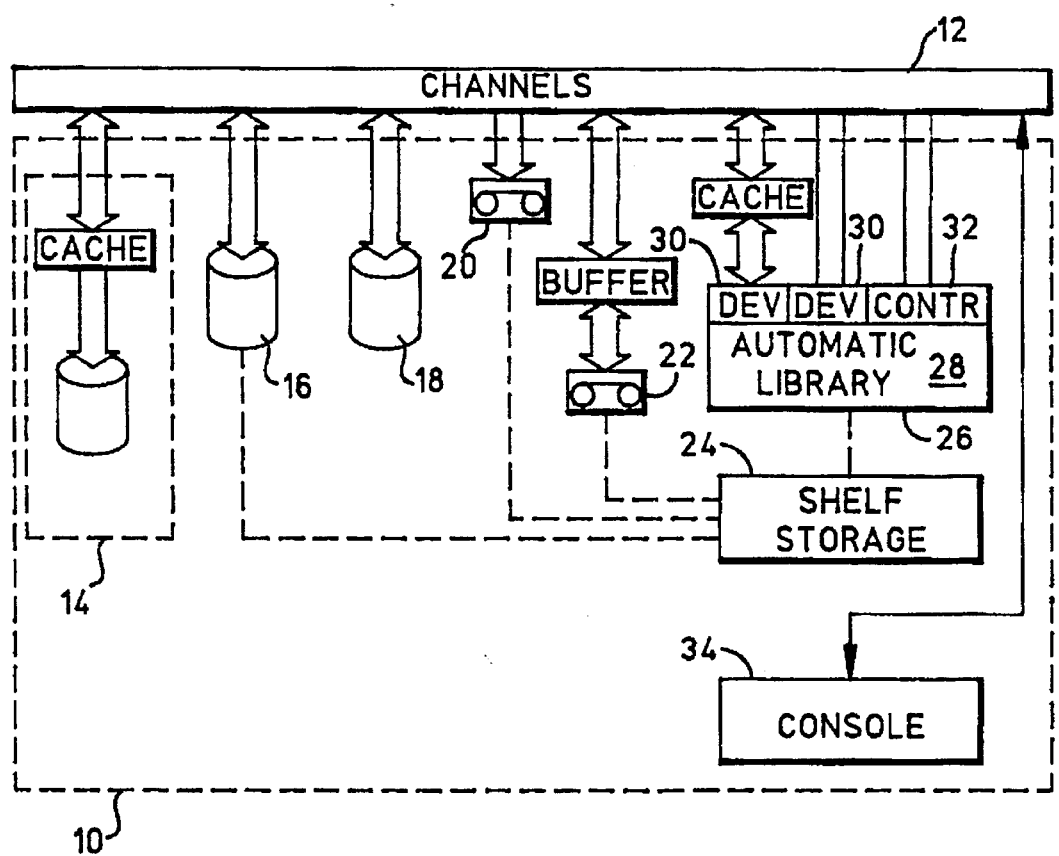
FIG. 1 is a functional block diagram of a peripheral data storage system from the prior art to which is invention can be advantageously applied.

FIG. 1 is a simplified diagram of a peripheral hierarchical data storage system 10 from the prior art. Data storage system 10 is attached to the data channels 12. A first hierarchical level of data storage system 10 includes the cached Data Access Storage Device (DASD) subsystem 14. A second level of the hierarchy includes the medium performance DASDs 16. The high-performance DASDs 18 may also be part of the first level of the hierarchy. A third level of the hierarchy can include a directly-connected tape subsystem 20 or a buffered tape subsystem 22. A fourth level of the hierarchy includes shelf storage units 24. In the prior art, operators carry tape reels (volumes) between storage units 24 and tape drives in tape subsystems 20 and 22, as indicated by the dotted lines in FIG. 1.

An automatic data media (tape or disk) library 26 may also be included in data storage system 10. Library 26 typically includes a media-handling library subsystem 28, a plurality of recorders/readers (tape or disk) DEV 30 and a library controller CONTR 32. Shelf storage units 24 are also operatively associated with library 26. A storage console 34 is the terminal used to communicate with the host processor (not shown) for manual purposes in peripheral data storage system 10. Automatic library 26 can be at a lower level in the data storage hierarchy, the precise level being a matter of design choice.

Figure 2:
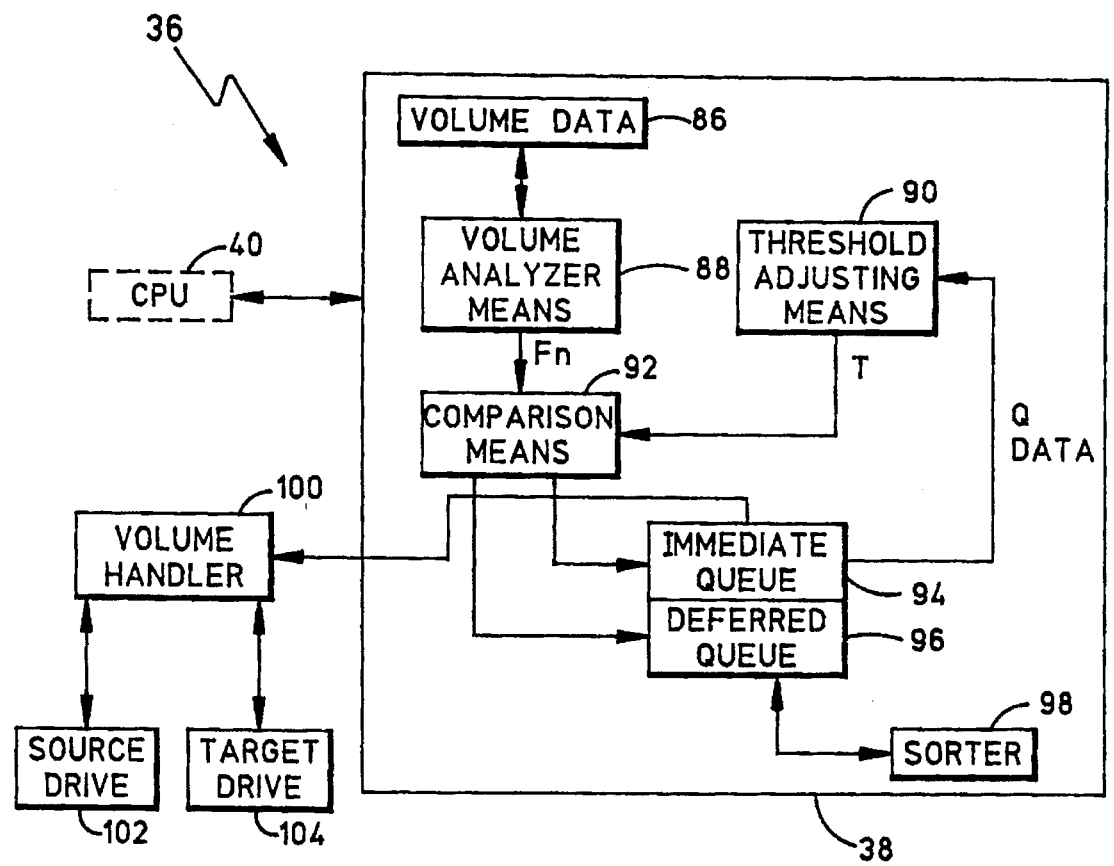
FIG. 2 is a functional block diagram of an exemplary embodiment of the system of this invention.

FIG. 2 provides a functional block diagram of an illustrative embodiment of the storage reclamation system 36 of this invention. Storage reclamation system 36 may be part of library controller CONTR 32 or may be independently embodied. For purposes of illustration, storage reclamation system 36 is shown embodied as a plurality of data and program objects in a memory 38 subject to the control of an external Central Processing Unit (CPU) 40. The detailed operation of system 36 in FIG. 2 is presented hereinbelow and will be better understood in view of the following discussion of the storage reclamation method of this invention.

The method of this invention is now described. This method is described herein for a data storage library but may be readily applied to any variable-cost action processing problem. As discussed above, the fundamental variable-cost action processing problem is to find an optimal balance between immediate processing to exploit idle capacity and processing delay to permit the entire library (action list) to be sorted so that the emptiest volumes (lowest-cost actions) can be first processed. By first processing the emptiest volumes (those with the lowest valid data occupancy fraction, $F_n$, where n represents a library volume index), more empty volumes are recycled in less time early in the process. On the other hand, when scanning and sorting large numbers of volumes, the recycle processing capacity is held idle for a longer time awaiting completion of the scan and sort.

Thus, the method of this invention introduces five new techniques for optimizing the number of recycled volumes in a given (early) time interval. The first of these is the preferential recycling of volumes having low valid data occupancy fraction $F_n$ (low cost). Clearly this technique provides no advantage in situations where the entire library is recycled during the specified time interval because the order of processing does not affect the total recycle processing time for the entire library. However, in the common situation where the recycle processing time interval is insufficient to permit recycling of all volumes in the library, preferential recycling of relatively empty volumes provides a dramatic increase in the number of empty volumes released during the critical early part of the recycle processing interval.

The second improvement of this invention is the organization of all volumes into three groups: "empty" volumes presenting the lowest variable cost (no mount); "mount-dominated cost" volumes having less than a base bar ratio (e.g., one percent) of valid data, which incur a fixed mounting cost and a relatively small data transfer cost; and "transfer-dominated cost" volumes having more than a base bar ratio of valid data, incurring significant data transfer costs in addition to the fixed mounting cost. Empty volumes are always inserted at the top of the immediate queue, mount-dominated volumes are always placed in the immediate queue, preferably at the bottom thereof, and transfer-dominated volumes are assigned in accordance with a cost-threshold procedure of the invention.

The third improvement of this invention is to occupy the recycle processing resources without delay during the volume scanning and sorting operation, thereby avoiding the sharply reduced efficiency arising from idle recycle processing capacity early in the recycle processing time interval. That is, candidate volumes are selected for immediate recycle processing according to a valid data occupancy fraction (cost) threshold T criterion, which is never reduced below a base bar ratio that defines the transition from transfer-dominance to mount-dominance.

The fourth improvement of this invention is the method for optimizing the immediate queue by dynamically adjusting the threshold T responsive to changes in the number of volumes in the immediate queue relative to available recycle processing capacity. The initial value of threshold T should be high enough to rapidly engage the initially idle processing capacity. For instance, this value can be initially set at T=0.05, representing a volume wherein only five percent of the data storage capacity is occupied by valid data.

The fifth improvement of this invention is the imposition of an irreducible minimum value for the threshold T. This minimum is herein denominated the "base bar" and is a value that all can agree represents excellent candidates for recycling. The inventors prefer a base bar value of 0.01. All candidates that fall below the base bar value are always placed on the immediate queue, wherever they appear in the scanning order. This greatly reduces the risk of exhausting the immediate queue during the scan/sort, which could happen under some queue conditions when several excellent mount-dominated volumes are earlier routed to the deferred queue because of an excessively long immediate queue. Such excellent candidates would then not be processed until completion of the ordered recycle processing queue and, in contrast, some higher occupancy volumes, maybe not very good ones, could later be assigned to a newly inadequate immediate queue and processed earlier.

To ensure that the initial threshold T does not filter out all candidates for an unacceptably prolonged time interval, the effect of threshold T is re-examined periodically. This periodicity may be either temporal or numerical or both; that is, threshold T can be reexamined at regular time intervals or after evaluation of a predetermined number of library volumes. Threshold re-examination must be a simple operation to avoid burdening the queuing and sorting effort but must also be accomplished frequently to permit rapid adjustment to changes in conditions. The inventors have found that one-second time intervals are sufficient for reviewing the value of threshold T and that a numerical volume count of fifty volumes also serves as an adequate re-examination interval. Preferably, threshold T is adjusted when either the one-second time interval or the fifty-volume count expire. The method of this invention provides a simple and adjustable selection criterion that becomes less restrictive as prospectively idle recycle processing capacity is discovered (few volumes in the "immediate" queue) and more restrictive when all recycle processing capacity is busy and an "adequate" queue of volumes accumulates. The condition of the immediate queue is reexamined regularly as mentioned above and the value of threshold T is adjusted accordingly. Although the threshold T is dynamically adjusted, it is adjusted only at snapshot intervals according to the time interval and volume count measures discussed.

The system and method of this invention rely on several assumptions regarding multivolume library (manual or automated) operation. It is assumed that a list of all potential work exists but nothing is assumed about the ordering of that work. It is also assumed that items from the work list can be processed in any order. Also, it is assumed that the system user assigns the number of "tasks" (resources) made available for recycle processing. As used herein, a "task" denominates a pair of tape drives, with one tape drive assigned for mounting and reading the recycled source volume and the other tape drive assigned to mounting and writing on a compaction target volume. Thus, during recycle processing, a series of recycled library volumes are mounted in sequence on the first drive of the pair and the valid data thereon is read and transferred over to a single compaction target volume on the second drive of the pair. The compaction target volume is replaced only when full.

Figure 3A:
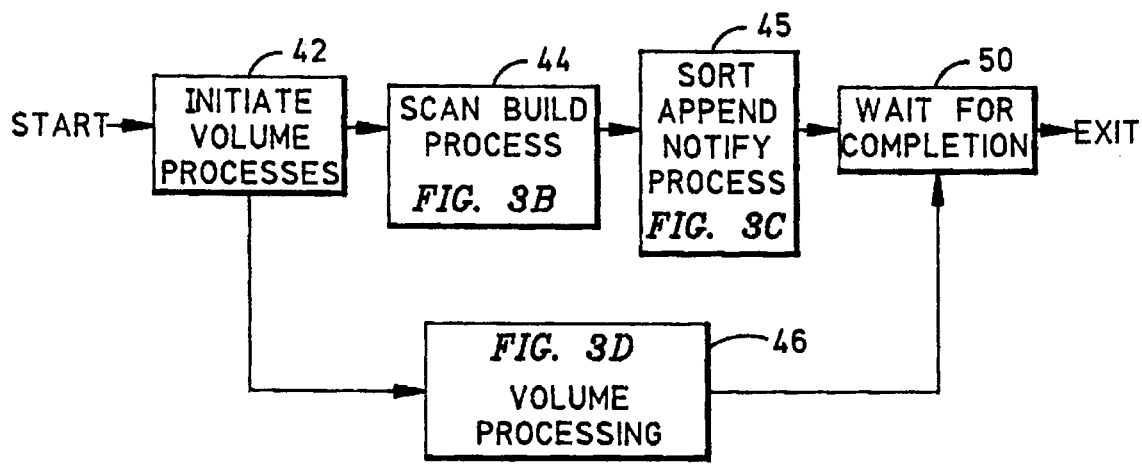
FIGS. 3A–3E show functional block diagrams illustrating the method of this invention.

FIG. 3A provides a functional block diagram showing the basic steps of the method of this invention. After starting at step 42, the method of this invention proceeds to build the recycle queue by scanning and building the immediate and deferred queues in step 44 followed by sorting and appending the deferred queue in step 45. Concurrently with steps 44 and 45, the volumes are processed for recycling in step 46.

Assuming that N pairs of tape drives (that is, N tasks) are reserved by the user, then N source volumes can be mounted concurrently. Each volume is selected in step 46 from the head of the immediate queue. When the desired number of tapes have been freed, the last volume has been recycled, or when the recycle processing interval expires, the procedure exits at step 50.

FIGS. 3B–3E provide functional block diagrams showing the details of the scanning and dual queuing step 44, the sorting and appending step 45 and the volume processing step 46 from FIG. 3A. Step 56 from FIG. 3B can also be understood with reference to the pseudocode embodiment shown below in Table 1.

TABLE 1

```
/* ******************************************************************************** */
/*      PROCEDURE NAME = MANAGE_QUEUE                                                 */
/*      FUNCTION = ADD THE VOLUME ENTRY, YQE, TO THE APPROPRIATE QUEUE                */
/*      INPUT = YQE TO ADD TO THE QUEUE                                               */
/*      OUTPUT = QUEUE UPDATED                                                        */
/* ******************************************************************************** */
QUEUE_YQE:PROC;
DCL QY_LOWER FIXED (31),
    QY_UPPER FIXED (31),
    QY_SECONDS FIXED (31);
IF YQE_PERCENT_VALID > BAR_PERCENT          /* VALID DATA ABOVE BAR?          */
    THEN CALL ARCRCYQD(YQEWKA)              /* YES, ADD TO DEFERRED QUEUE     */
    ELSE CALL ARCRCYQI(YQEWKA)              /* NO, ADD TO IMMEDIATE QUEUE     */
CALL STCK;                                  /* GET CURRENT TIME               */
QY_SECONDS = TIME_IN_SECONDS -SECONDS_HOLD;
IF QY_SECONDS > YGCB_BAR_SECONDS |
    RECORD_COUNT > YGCB_BAR_RECORDS
    THEN
    BEGIN;                                  /* TIME TO ADJUST BAR             */
|
|   RECORD_COUNT = 0;
|   TIME_HOLD = TIME_NOW;
|
|       /* ******************************************************************************** */
|       /*                                                                                  */
|       /* DETERMINE THE LOWER AND UPPER BOUNDS OF THE IMMEDIATE                            */
|       /* QUEUE BY WHICH REDUCTIONS OF THE BAR WILL TAKE PLACE.                            */
|       /* TO ALLOW FOR TUNING, YGCB_BAR_LOWER AND YGCB_BAR_UPPER                           */
|       /* ARE PATCHABLE FIELDS AS PERCENTAGES OF N. THUS 50                                */
|       /* REPRESENTS N/2 AND 100 REPRESENTS N, WHERE N IS THE                              */
|       /* NUMBER OF MAXIMUM TASKS SPECIFIED BY SETSYS PARAMETER.                           */
|       /*                                                                                  */
|       /* ******************************************************************************** */
|
|   QY_LOWER = YGCB_MAXTASKS * YGCB_BAR_LOWER / 100;
|   QY_UPPER = QY_LOWER + YGCB_MAXTASKS * YGCB_BAR_UPPER / 100;
|
|   SELECT;                                 /* SELECT ADJUSTMENT BASED ON VARIOUS FACTORS */
|   :
|   :    /* ******************************************************************************** */
|   :    /*                                                                                  */
|   :    /* CASE 1: IF NOT ALL TASKS ARE BUSY, RAISE THE BAR 3%                              */
|   :    /*                                                                                  */
|   :    /* ******************************************************************************** */
|   :
|   :    WHEN ( YGCB_RCYVS_IDLE_TASKS > 0 )         /* CASE 1                  */
|   :        BEGIN;
|   :        |   BAR_PERCENT = BAR_PERCENT + YGCB_BAR_IDLE;
|   :        END;
|   :
|   :    /* ******************************************************************************** */
|   :    /*                                                                                  */
|   :    /* CASE 2: IF ALL TASKS ARE BUSY, BUT NOTHING IS QUEUED                             */
|   :    /* FOR IMMEDIATE WORK, RAISE THE BAR 1%                                             */
|   :    /*                                                                                  */
|   :    /* ******************************************************************************** */
|   :
|   :    WHEN ( YGCB_IMMED_NUM = 0 )                /* CASE 2                  */
|   :        BEGIN;
|   :        |   BAR_PERCENT = BAR_PERCENT + YGCB_BAR_EMPTY;
|   :        END;
|   :
|   :    /* ******************************************************************************** */
|   :    /*                                                                                  */
|   :    /* CASE 3: IF IMMEDIATE QUEUE IS NOT EMPTY, BUT HAS LESS                            */
|   :    /* THAN N/2 ENTRIES, THIS IS THE DESIRED LEVEL. ASSUMING                            */
|   :    /* WE WILL FIND ELIGIBLES FASTER THAN WE REMOVE FOR                                 */
|   :    /* PROCESSING, LOWER THE BAR BY 1%                                                  */
|   :    /*                                                                                  */
|   :    /* ******************************************************************************** */
```

TABLE 1-continued

```
|   :
|   :      WHEN ( YGCB_IMMED_NUM <= QY_LOWER )        /* CASE 3                        */
|   :         BEGIN;
|   :         |    BAR_PERCENT = MAX(YGCB_BAR_BASE,BAR_PERCENT-YGCB_BAR_R1);
|   :         END;
|   :
|   :      /* ******************************************************************* */
|   :      /*                                                                     */
|   :      /* CASE 4: IF IMMEDIATE QUEUE IS NOT EMPTY, BUT HAS N/2+1              */
|   :      /* THRU N ENTRIES, CUT THE BAR IN HALF. TO ALLOW TUNING,               */
|   :      /* THE PATCHABLE FIELD YGCB_BAR_R2 REPRESENTS A MULTIPLYING            */
|   :      /* FACTOR IN PERCENTAGES, SO 50 REPRESENTS 1/2                         */
|   :      /*                                                                     */
|   :      /* ******************************************************************* */
|   :
|   :      WHEN ( YGCB_IMMED_NUM <= QY_UPPER )        /* CASE 4                        */
|   :         BEGIN;
|   :         |    BAR_PERCENT = MAX(YGCB_BAR_BASE,
|   :         |                       BAR_PERCENT * YGCB_BAR_R2 / 100);
|   :         END;
|   :
|   :      /* ******************************************************************* */
|   :      /*                                                                     */
|   :      /* CASE 5: IF IMMEDIATE QUEUE IS NOT EMPTY, BUT HAS MORE               */
|   :      /* THAN N ENTRIES, CUT THE BAR IN FOURTH. TO ALLOW TUNING,             */
|   :      /* THE PATCHABLE FIELD YGCB_BAR_R3 REPRESENTS A MULTIPLYING            */
|   :      /* FACTOR IN PERCENTAGES, SO 25 REPRESENTS 1/4TH                       */
|   :      /*                                                                     */
|   :      /* ******************************************************************* */
|   :
|   :      OTHERWISE                                   /* CASE 5                        */
|   :         BEGIN;
|   :         |    BAR_PERCENT = MAX(YGCB_BAR_BASE,
|   :         |                       BAR_PERCENT * YGBC_BAR_R3 / 100);
|   :         END;
|   END;                    /* SELECT ADJUSTMENT BASED ON VARIOUS FACTORS          */
|
END;                                                  /* TIME TO ADJUST BAR               */
END;                                                  /* END MANAGE_QUEUE                 */
```

Referring to FIG. 3A, the initial value of threshold T and the adjustment increments related to threshold T are initialized in step 42. Referring to Table 1, it can be appreciated that the initial value of threshold T is set to "BAR—PERCENT".

Figure 3B:
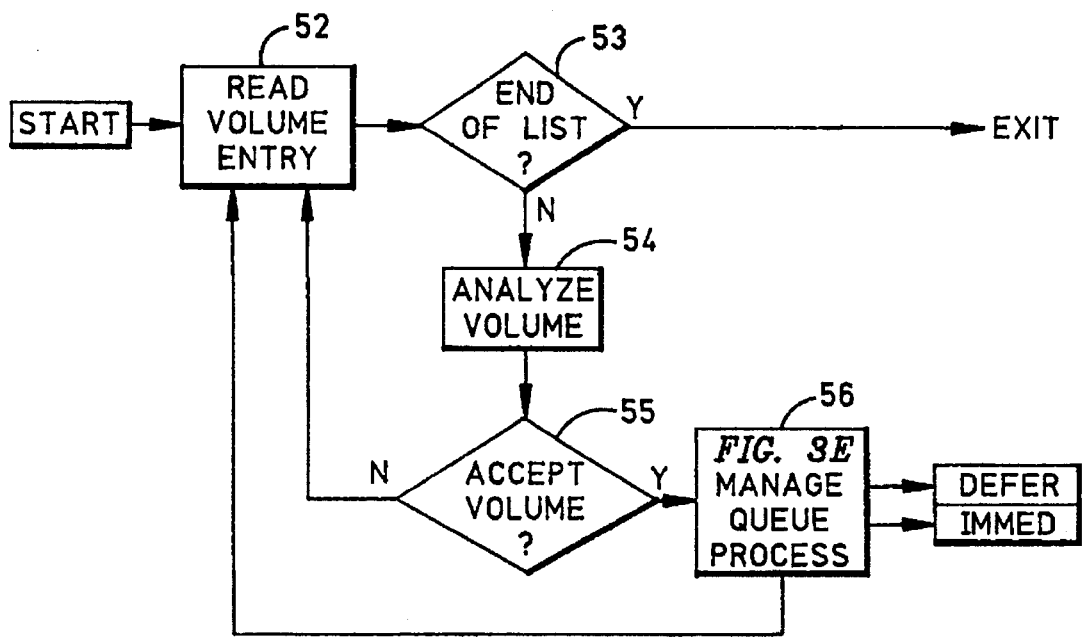

Referring to FIG. 3B, the library volume status records are scanned one by one starting with step 52, wherein information needed to compute the valid data occupancy fraction $F_m$ (processing cost) is retrieved for the $m^{th}$ library volume, where m=[1,M]in an M-volume library. After retrieval, step 53 tests for the end of the volume list. If all M library volume status records have been scanned, the process exits and proceeds to FIG. 3C, where the deferred queue is sorted and then appended to the immediate queue to form the final recycle processing queue. If unscanned volume status records remain, step 53 hands control to step 54, where the volume data is analyzed to determine $F_m$. Step 55 tests $F_m$ and rejects the volume if it exceeds a user specified value, returning control to step 52. Otherwise, step 55 hands control to the queue managing step 56, which assigns the volume to a queue by testing the $F_m$ value against the dynamic valid data occupancy fraction threshold T. After queuing of the volume, step 56 returns control to step 52 for the next volume.

Figure 3C:
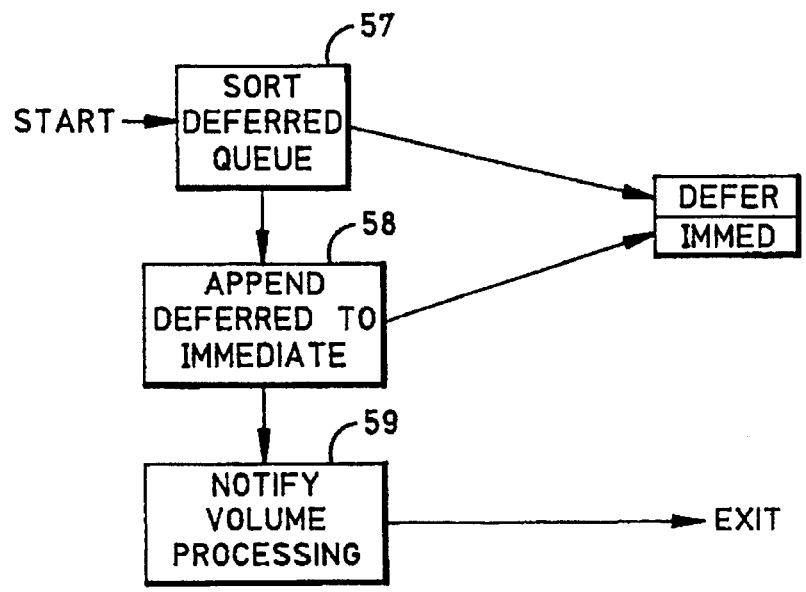

FIG. 3C shows the details of the sorting and appending step 45 from FIG. 3A. The completed deferred queue is first sorted in sorting step 57. After completion of the deferred queue sort, the deferred queue is appended to the immediate queue in step 58. The immediate queue with the appended deferred queue becomes a single processing queue and the volume processing step 46 (FIG. 3A) is so notified in step 59 of FIG. 3C. After notification, step 59 exits to step 50 of FIG. 3A to wait for completion of the volume processing step 46, which is shown in detail in FIG. 3D.

Figure 3D:
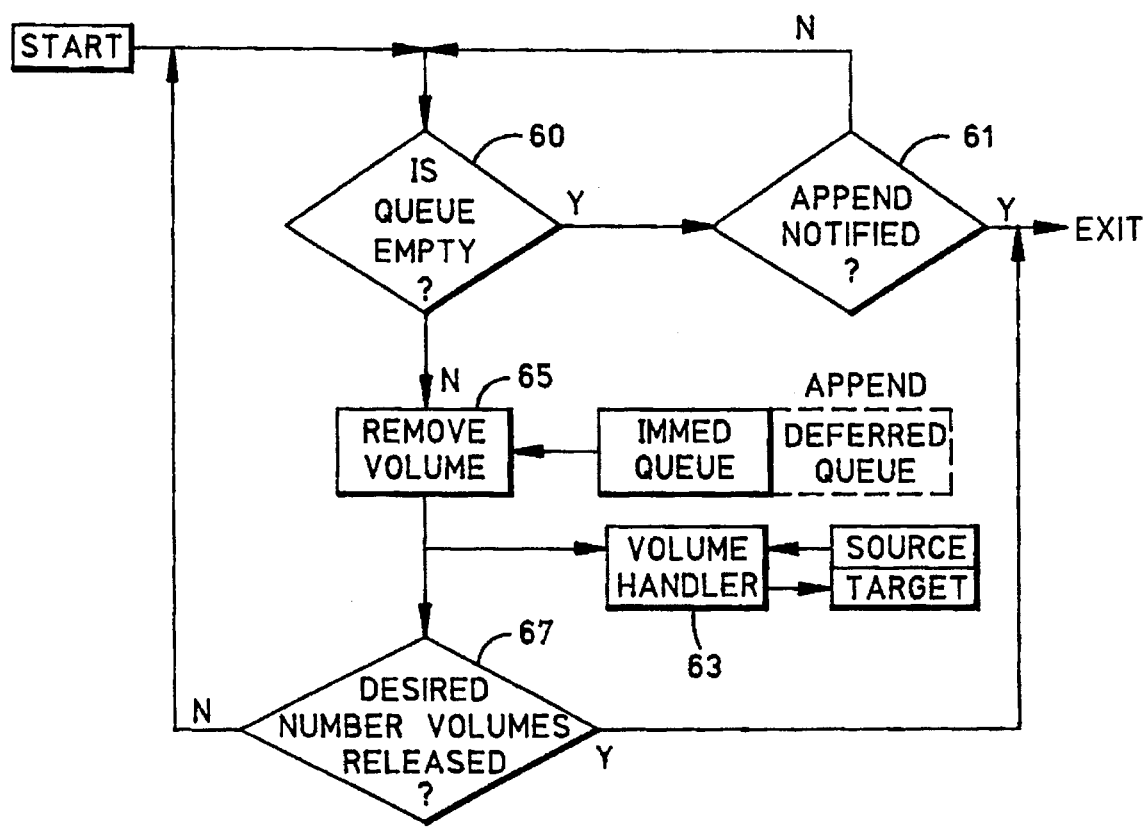

In FIG. 3D, volume processing begins with step 60, which tests the queue (the immediate queue, with the deferred queue appended when appropriate) to determine if any unprocessed volumes remain. If the queue is empty, step 61 tests to see if the deferred queue has been appended to the immediate queue and exits to step 50 of FIG. 3A after the immediate and deferred queues have both been exhausted. Otherwise, if the queue is empty and no append notification has been made, control is returned to step 60 and cycles between steps 60 and 61 awaiting a volume insertion into the immediate queue. As soon as a volume is available, the first volume is removed from the queue in step 65 and passed to the volume handler 63, which arranges for the necessary mounts and data transfers. After passing the volume to volume handler 63, step 65 passes control to step 67, which tests to determine whether the desired number of volumes have been emptied and released. When the desired number of empty volumes are obtained, the procedure exits to step 50 (FIG. 3A) and otherwise returns to step 60 to fetch the next (first) volume from the immediate queue.

Figure 3E:
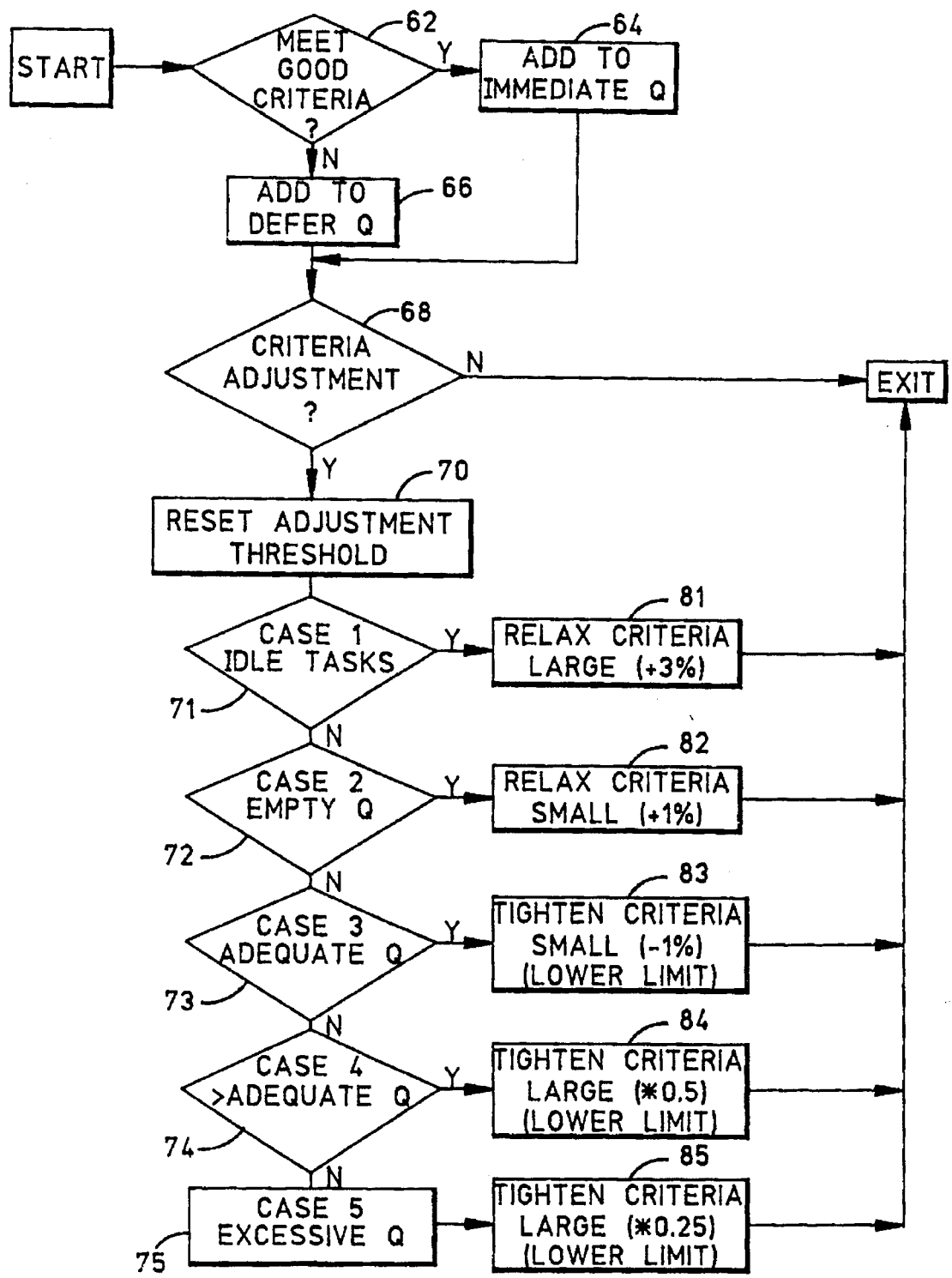

FIG. 3E provides the details of the queue management step 56 from FIG. 3B. The first step in FIG. 3E is the volume thresholding comparison step 62, which acts as a two-way distributer, assigning lower-cost volumes having low values of F, to the immediate queue in step 64 and assigning fuller higher-cost volumes to the deferred queue in step 66. Volumes added to the immediate queue in step 64 are generally processed in step 46 (FIG. 3A) in First-In-First- Out (FIFO) fashion except for empty volumes inserted at the head of the queue. This is acceptable because the threshold T filters only low $F_m$ values to the immediate queue, thereby providing much of the benefit available from a cost-ordered sort without the computation load.

Although not shown in step 64 (FIG. 3E), step 55 in FIG. 3B provides for inserting all "empty" volumes ($F_m$=0) at the head (beginning) of the immediate queue. Because these volumes are already empty, they need not be physically mounted to transfer ownership to available status, and thus represent the lowest cost of processing. Inserting these empty volumes at the beginning of the queue provides the optimal variable-cost processing sequence.

Finally, step 68 tests the threshold readjustment timing interval (and/or volume count) to determine whether the value of threshold T must be adjusted responsive to current immediate queue conditions. If step 68 fails, the procedure exits to step 52 (FIG. 3B) to scan status records for another library volume. When step 68 succeeds, control goes to step 70 for resetting the threshold T.

The inventors prefer dividing the threshold T adjustment procedure (beginning with step 70 in FIG. 3E) into five domains. These domains are listed as follows:

Case 1: where there are inactive tasks (idle recycle processing resources).

Case 2: where all assigned recycle tasks are active but the immediate queue is empty.

Case 3: where there are enough queued entries in the immediate queue to "adequately" feed all assigned recycle tasks at the anticipated rate.

Case 4: where there are more than "adequate" numbers of volumes queued in the immediate queue.

Case 5: where there are an excessive number of volumes in the immediate queue.

In FIG. 3E, steps 71–75 test for Cases 1–5, respectively, and steps 81–85 execute the specified threshold T adjustment operation for Cases 1–5, respectively. The pseudocode in Table 1 also shows the preferred threshold adjustment operations made for each of the five cases.

In Case 1, where there are inactive tasks, the threshold T is adjusted up substantially, thereby aggressively feeding the actually idle recycle processing resources. The inventors consider a +0.03 adjustment to be substantial for this purpose. For example, 0.05 is adjusted to 0.08.

In Case 2, where all tasks are active but the immediate queue is empty, the threshold T is also adjusted upward but less aggressively. A +0.01 adjustment is considered to be a reasonable action for Case 2. For example, 0.06 is adjusted to 0.07.

In Case 3, where the immediate queue is adequately occupied to prospectively feed all available recycle processing capacity at the anticipated rate of processing and queuing, the threshold T is adjusted downward by 0.01 because volumes are expected to be added to the immediate queue more rapidly than they are processed. For instance, 0.05 is adjusted to 0.04.

In Case 4, where the immediate queue is more than "adequate", the threshold T is adjusted sharply downward, by multiplying threshold T by a fraction. For instance, 0.06 is adjusted to 0.03=0.06/2. Downward threshold adjustments are made by fractional multiplication and thus are much more aggressive than upward adjustments, which are made by addition of a percentage value. An "adequate" queue length depends on the number of assigned tape drives (tasks) and can reasonably be considered to be about N/2 for N tasks.

Finally, for Case 5, where the immediate queue is excessive, the threshold T is adjusted downward very smartly but is never adjusted below the base bar value that defines mount-dominated volume processing cost. For instance 0.08 is adjusted to 0.02=0.08/4.

In an exemplary embodiment of the system and method of this invention, the inventors have established preferred values for the parameters discussed above. The initial threshold T value is preferred at five percent, and this initial value is never reduced below a base bar value of one percent. This 1% floor allows all mount-dominated volumes to be routed to the immediate queue for processing ahead of all transfer-dominated volumes. The threshold is reviewed after the elapse of one second or after scanning fifty volumes, whichever first occurs. The user resource assignment value of N tasks for recycle processing is assumed.

Adjustments of the threshold T are preferred as follows. The end of a scanning period, if not all tasks are busy (Case 1), then the bar is raised by 0.03 in attempting to feed all idle tasks without doing so at the expense of poor volume selection. If all tasks are busy but have nothing on the immediate queue to start when a task finishes (Case 2), then the bar is raised by 0.01 to provide immediate backup work for a finishing task. If the immediate queue is not empty but has less than or equal to N/2 volumes (Case 3), the threshold T is reduced by 0.01 (subject to the base bar) because the queue is expected to build faster than the recycle resources can complete. If the immediate queue has more than N/2 entries but less than N entries (Case 4), then the threshold T is reduced sharply to half of its current value, subject to not falling below the base bar level of one percent. Finally, if the immediate queue has more than N entries (Case 5) then the threshold T is drastically reduced to one-fourth of its current value, again subject to not falling below the one percent base bar level.

Returning to FIG. 2, the system of this invention is exemplified by several data and program objects in memory 38. The volume data 86 is scanned by the volume analyzer 88, which produces the valid data occupancy fraction $F_n$ for the $n^{th}$ volume. Another program object 90 sets and adjusts the value of threshold T. The values of $F_n$ and T are compared in the comparison means 92, which then assigns the $n^{th}$ volume to either the immediate queue 94 or deferred queue 96. Immediate queue 94 provides the queue data to threshold adjusting means 90 for use in adjusting the value of threshold T in the manner discussed above in connection with FIG. 3E. After all library volumes are scanned and added to queues 94 and 96, a sorting object 98 then sorts deferred queue elements in order of valid data occupancy fraction $F_n$ and deferred queue 96 is then appended to immediate queue 94.

As soon as immediate queue 94 receives an assigned volume, this information is available to the volume handler 100, which processes the volume independently of the queue-building objects. Volume handler 100 then arranges for the automatic or manual mounting of the assigned volume to source drive 102. After mounting, the volume on source drive 102 is read and all valid data is transferred to a compaction target volume on the target drive 104. As discussed above, the system of this invention may include a plurality N of source drive and target drive pairs, exemplified by drives 102–104.

The inventors have implemented the system and method of this invention in a library containing more 100,000 volumes. The time to build the final sorted and appended recycle processing queue was found to be over 2.5 hours. Without the method of this invention, the early recycle performance of the system without a sorted recycle processing queue is about nine recycled volumes per hour, or about 210 volumes released in a 24-hour interval. By using the sorted recycle processing queue of this invention, the early recycle processing performance was increased to 40 volumes per hour after the idle 2.5-hour scan and sort interval. With the dual queue and dynamic threshold features of this invention, recycle processing was performed over the initial 2.5 hour sorting period, thereby releasing an additional 100 volumes in the time before the other method can be started. It can be readily appreciated that increasing the volume recycling rate during the early hours is particularly advantageous in this example, where processing the entire library would require several thousand hours of continuous recycle processing at the rate known in the art.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In a procedural environment having an action processing capacity and a plurality of N actions to perform, wherein the actions may be performed in any order, wherein a variable cost $F_n=(0,1)$ can be assigned for each said action, wherein $F_n=0$ represents the lowest cost, and wherein N and $n \leq N$ are positive integers, a machine-implemented method for processing said actions, said method comprising the steps of:

(a) arranging a plurality of $M \leq N$ of said actions into a processing queue ordered by said variable-cost $F_m$, wherein M and $m \leq M$ are positive integers, said arranging step comprising the steps of:

(a.1) apportioning said M actions into an immediate queue and a deferred queue by performing steps comprising:

(a.1.1) defining the variable-cost threshold $T=[0,1]$;

(a.1.2) placing the $m^{th}$ said action in said immediate queue if $F_m \leq T$;

(a.1.3) placing the $m^{th}$ said action at the beginning of said immediate queue if $F_m=0$; and (a.1.4) otherwise placing said $m^{th}$ action in said deferred queue;

(a.2) sorting said actions in order of said variable cost $F_m$ in said deferred queue after completion of said apportioning step (a.1); and (a.3) appending said deferred queue to said immediate queue to represent said processing queue after completion of said sorting step (a.2);

(b) before completion of said apportioning step (a.1) performing repeatedly the steps of (b.1) performing to completion the first action in said immediate queue, and (b.2) removing said action from said processing queue.

2. The method of claim 1 wherein said apportioning of step (a.1) further comprises the step of:

(a.1.5) adjusting said threshold T according to the relationship of the contents of said immediate queue to said action processing capacity.

3. The method of claim 2 wherein said adjusting step (a.1.5) comprises the steps of:

(a.1.5.1) adding an increment to increase said threshold T responsive to an inadequate number of said actions in said immediate queue;

(a.1.5.2) subtracting a decrement to decrease said threshold T responsive to the presence of an adequate plurality of said actions in said immediate queue; and (a.1.5.3) multiplying by a fraction to decrease said threshold T responsive to the presence of an excessive plurality of said actions in said immediate queue.

4. In a data storage library having a recycle processing capacity and a plurality N of volumes for storing data, wherein a fraction $F_n=[0,1]$ of the $n^{th}$ said volume contains valid data and wherein N and $n \leq N$ are positive integers, a machine-implemented method for compacting said valid data to recover empty volumes, said method comprising the steps of:

(a.1) arranging a plurality $M \leq N$ of said volumes into a recycle processing queue ordered by said fraction $F_m$, wherein M and $m \leq M$ are positive integers, said arranging step comprising the steps of:

(a.1.1) apportioning said M volumes into an immediate queue and a deferred queue by performing steps comprising:

(a.1.2) defining a valid data occupancy fraction threshold $T=[0,1]$;

(a.1.3) placing the $m^{th}$ said volume in said immediate queue if $F_m \leq T$: queue if $F_m=0$; and (a.1.4) otherwise placing said $m^{th}$ volume in said deferred queue;

(a.2) sorting said volumes in order of said faction $F_m$ in said deferred queue after completion of said apportioning step (a.1); and (a.3) appending said deferred queue to said immediate queue to form said recycle processing queue after completion of said sorting step (a.2);

(b) before completion of said apportioning step (a.1), performing repeatedly the steps of (b.1) transferring said valid data from the first volume in said immediate queue to a compaction target volume, and (b.2) removing said first volume from said recycle processing queue.

5. The method of claim 4 wherein said apportioning step (a.1) further comprises the step of:

(a.1.5) adjusting said threshold T according to the relationship of the contents of said immediate queue to said recycle processing capacity.

6. The method of claim 5 wherein said adjusting step (a.1.5) comprises the steps of:

(a.1.5.1) adding an increment to increase said threshold T responsive to an inadequate number of volumes in said immediate queue;

(a.1.5.2) multiplying by a fraction to decrease said threshold T responsive to the presence of an excessive plurality of volumes in said immediate queue.

7. In an apparatus for automatic management of a data storage library having a recycle processing capacity and a plurality N of volumes for storing data, wherein a fraction $F_n=[0,1]$ of the $n^{th}$ said volume contains valid data and wherein N and $n \leq N$ are positive integers, a storage recovery system for compacting said valid data to recover empty volumes for reuse, said system comprising:

queuing means for arranging a plurality $M \leq N$ of said volumes into a recycle processing queue ordered by said fraction $F_m$, wherein M and $m \leq M$ are positive integers;

recycling means coupled to said queuing means for transferring said valid data from the first volume in said recycle processing queue to a compaction target volume and for removing said first volume from said recycle processing queue;

selection means in said queuing means for apportioning said plurality M of volumes into an immediate queue and a deferred queue;

launching means coupled to said queuing means and said recycling means for starting said recycling means before formation of said recycle processing queue, whereby said first volume is taken from said immediate queue;

sorting means in said queuing means for sorting the volumes in order of said fraction $F_m=[0,1]$ in said deferred queue and for appending said deferred queue to said immediate queue to firm said recycle processing queue;

thresholding means coupled to said selection means for comparing said fraction $F_m$ for the $m^{th}$ said volume with a valid data occupancy fraction threshold $T=[0,1]$, whereby said $m^{th}$ volume is added to said immediate queue if $F_m \leq T$ and otherwise is added to said deferred queue; and bypass means coupled to said thresholding means for adding said $m^{th}$ volume to the front of said immediate queue when $F_m=0$.

8. The storage recovery system of claim 7 further comprising:

adjusting means coupled to said thresholding means for adjusting said threshold T according to the relationship of the contents of said immediate queue to said recycle processing capacity.

9. The storage recovery system of claim 8 further comprising:

adding means in said adjusting means for adding an increment to increase said threshold T responsive to the presence of an inadequate plurality of volumes in said immediate queue; and proportioning means in said adjusting means for multiplying by a fraction to decrease said threshold T responsive to the presence of an excessive plurality of volumes in said immediate queue.

10. An automated data storage tape library having a recycle processing capacity and a plurality N of tape volumes for storing data, wherein a fraction $F_n=[0,1]$ of the $n^{th}$ said tape volume contains valid data and wherein N and $n \leq N$ are positive integers, said tape library including volume recovery means for compacting said valid data to recover empty tape volumes for reuse, wherein said volume recovery means comprises:

queuing means for arranging a plurality $M \leq N$ of said tape volumes into a recycle processing queue ordered by said fraction $F_m$, wherein M and $m \leq M$ are positive integers;

recycling means coupled to said queuing means for transferring said valid data from the first tape volume in said recycle processing queue to a compaction target volume and for removing said first tape volume from said recycle processing queue;

selection means in said queuing means for apportioning said plurality M of tape volumes into an immediate queue and a deferred queue;

launching means coupled to said queuing means and said recycling means for starting said recycling means before formation of said recycle processing queue, whereby said first tape volume is taken from said immediate queue;

sorting means in said queuing means for sorting the tape volumes in order of said fraction $F_m=[0,1]$ in said deferred queue and for appending said deferred queue to said immediate queue to form said recycle processing queue;

thresholding means coupled to said selection means for comparing said fraction $F_m$ for the $m^{th}$ said tape volume with a valid data fraction occupancy threshold $T=[0,1]$, whereby said $m^{th}$ tape volume is added to said immediate queue if $F_m \leq T$ and otherwise is added to said deferred queue; and bypass means coupled to said thresholding means for adding said $m^{th}$ tape volume to the front of said immediate queue when $F_m=0$.

11. The automated data storage tape library of claim 10 further comprising:

adjusting means coupled to said thresholding means for adjusting said threshold T according to the relationship of the contents of said immediate queue to said recycle processing capacity.

12. The automated data storage tape library of claim 11 further comprising:

adding means in said adjusting means for adding an increment to increase said threshold T responsive to the presence of an inadequate plurality of tape volumes in said immediate queue; and proportioning means in said adjusting means for multiplying by a fraction to decrease said threshold T responsive to the presence of an excessive plurality of tape volumes in said immediate queue.

13. An automated optical data storage library having a recycle processing capacity and a plurality N of optical volumes for storing data, wherein a fraction $F_n=[0,1]$ of the $n^{th}$ said optical volume contains valid data and wherein N and $n \leq N$ are positive integers said optical data storage library including volume recovery means for compacting said valid data to recover empty optical volumes for reuse wherein said volume recovery means comprises:

queuing means for arranging a plurality $M \leq N$ of said optical volumes into a recycle processing queue ordered by said fraction $F_m$, wherein M and $m \leq M$ are positive integers;

recycling means coupled to said queuing means for transferring said valid data tom the first optical volume in said recycle processing queue to a compaction target volume and for removing said first optical volume from said recycle processing queue;

selection means in said queuing means for apportioning said plurality M of optical volumes into an immediate queue and a deferred queue;

launching means coupled to said queuing means and said recycling means for starting said recycling means before formation of said recycle processing queue, whereby said first optical volume is taken from said immediate queue;

sorting means in said queuing means for sorting the optical volumes in order of said fraction $F_m=[0,1]$ in said deferred queue and for appending said deferred queue to said immediate queue to form said recycle processing queue;

thresholding means coupled to said selection means for comparing said fraction $F_m$ for the $m^{th}$ said optical volume with a valid data fraction occupancy threshold $T=[0,1]$, whereby said $m^{th}$ optical volume is added to said immediate queue if $F_m \leq T$ and otherwise is added to said deferred queue; and bypass means coupled to said thresholding means for adding said $m^{th}$ optical volume to the front of said immediate queue when $F_m=0$.

14. The automated optical data storage library of claim 13 further comprising:

adjusting means coupled to said thresholding means for adjusting said threshold T according to the relationship of the contents of said immediate queue to said recycle processing capacity.

15. The automated optical data storage library of claim 14 further comprising:

adding means in said adjusting means for adding an increment to increase said threshold T responsive to the presence of an inadequate plurality of optical volumes in said immediate queue; and proportioning means in said adjusting means for multiplying by a fraction to decrease said threshold T responsive to the presence of an excessive plurality of optical volumes in said immediate queue.

16. A machine-implemented method for reclaiming data storage volumes in a multi-volume data storage library having a plurality of said data storage volumes, each volume having a variable-cost of reclaiming valid data thereon, said method comprising the steps of:

arranging a plurality of data storage volumes into a processing queue and ordering said volumes according to their variable-costs by performing steps comprising:
apportioning the volumes into an immediate queue and a deferred queue by performing steps comprising:
defining a variable-cost threshold;
for each data storage volume, performing steps comprising:
placing the volume in the immediate queue if its variable-cost does not exceed the variable-cost threshold;
otherwise placing the volume in the deferred queue; and
reconfiguring the processing queue by sorting the volumes in the deferred queue in order of variable cost and then appending the sorted deferred queue to the immediate queue; and repeatedly performing the steps of (a) copying valid data from the first volume in the processing queue to a designated compaction target volume, and (b) removing the first volume from said processing queue.

17. The method of claim 16, wherein the repeatedly performed steps are initiated before completion of the apportioning step.

18. The method of claim 16, further comprising steps of adjusting the variable-cost threshold according to the relationship of the contents of said immediate queue to an action processing capacity of said storage library, said adjusting steps comprising:

responsive to an inadequate number of volumes in the immediate queue, increasing the variable-cost threshold by a predetermined increment;

responsive to the presence of an adequate plurality of volumes in the immediate queue, decreasing the variable-cost threshold by a predetermined increment; and responsive to the presence of an excessive plurality of volumes in the immediate queue, decreasing the variable-cost threshold by multiplying the variable-cost threshold by a fraction less than one.

19. The method of claim 16, the variable cost of each data volume being a representation of the data occupancy of that volume.

20. The method of claim 16, the apportioning step further comprising the step of, for each data storage volume, placing the volume at the beginning of the immediate queue if its variable-cost is substantially zero.

* * * * *

UNITED STATES PATENT AND TRADEMARK OFFICE
CERTIFICATE OF CORRECTION

PATENT NO. : 5,623,693
DATED : April 22, 1997
INVENTOR(S) : Ashton et al

It is certified that error appears in the above-indentified patent and that said Letters Patent is hereby corrected as shown below:

Column 13, line 50, change "step (a.1) performing" to --step (a.1, performing--.
Column 14, line 11, change "(a.1)' to --(a)--.
Column 14, line 15, change "(a.1.1)" to --(a.1)--.
Column 14, line 18, change "(a.1.2)" to --(a.1.1)--.
Column 14, line 20, change "(a.1.3)" to --(a.1.2)--.
Column 14, line 20, change "$F_m \leq T$: queue if $F_m=0$; and" to --$F_m \leq T$; (a.1.3) placing said $m^{th}$ volume at the beginning of said immediate queue if $F_m=0$; and--.
Column 15, line 9, change "queue to firm" to --queue to form--.
Column 16, line 29, change "integers said optical" to --integers, said optical--.
Column 16, line 32, change "reuse wherein" to --reuse, wherein--.
Column 16, line 39, change "data tom" to --data from--.

Signed and Sealed this

Second Day of September, 1997

Attest:

*Attesting Officer*

BRUCE LEHMAN

*Commissioner of Patents and Trademarks*